United States Patent [19]

Grimble

[11] 3,982,914
[45] Sept. 28, 1976

[54] DRIFT ELIMINATORS FOR EVAPORATIVE COOLING TOWERS

[75] Inventor: Ralph E. Grimble, Finleyville, Pa.

[73] Assignee: Westinghouse Electric Corporation, Pittsburgh, Pa.

[22] Filed: Mar. 7, 1974

[21] Appl. No.: 448,860

[52] U.S. Cl. .......................... 55/257 QV; 55/440; 55/DIG. 37; 261/111; 261/DIG. 77; 261/DIG. 11; 55/267

[51] Int. Cl.² ..................... B01D 45/08; F28C 1/00

[58] Field of Search ...... 55/440, 447, 462, DIG. 14, 55/DIG. 37, 442, 443, 257, 267; 261/DIG. 11, 111, DIG. 77; 98/121 R

[56] References Cited
UNITED STATES PATENTS

| 1,181,470 | 5/1916 | Massip | 55/440 X |
|---|---|---|---|
| 1,818,994 | 8/1931 | Kreisinger | 55/440 X |
| 2,348,163 | 5/1944 | Zimmerman | 55/440 |
| 2,662,553 | 12/1953 | Dimmock | 55/DIG. 37 |
| 3,224,175 | 12/1965 | Beach | 55/440 |

FOREIGN PATENTS OR APPLICATIONS

| 773,786 | 11/1934 | France | 55/447 |
|---|---|---|---|
| 1,901,014 | 11/1970 | Germany | 55/440 |
| 203,068 | 9/1923 | United Kingdom | 55/443 |

Primary Examiner—Frank W. Lutter
Assistant Examiner—David L. Lacey
Attorney, Agent, or Firm—F. S. Baehr, Jr.

[57] ABSTRACT

Crescent shaped vanes are so disposed in an evaporative cooling tower that the vanes generally have their leading edges aligned with a plane which forms an acute angle with a vertical plane and that adjacent vanes form a continuous smooth curve flow path which is generally directed upwardly and changes less than 90° in direction to form an effective, low-pressure drop drift eliminator.

5 Claims, 2 Drawing Figures

DRIFT ELIMINATORS FOR EVAPORATIVE COOLING TOWERS

BACKGROUND OF THE INVENTION

1. Field of the Invention

This invention relates to cooling towers and more particularly to drift eliminators utilized downstream of the evaporative portion of such cooling towers.

2. Description of the Prior Art

Nuclear power plants have spawned emphasis upon environmental disturbances known as thermal pollution. Thermal pollution is the term utilized to designate the effect of the discharge of large quantities of condenser coolant water typically 200,000 gallons per minute, into the environment adjacent a power plant. This effluent water is usually 20° to 25°F higher than the temperature of the influent water. The affect of this temperature rise and thermal gradient upon the marine and aquatic life is the subject of much concern.

To reduce the amount of thermal pollution cooling towers are often utilized and while the use of cooling towers offers some relief for thermal pollution, they introduce other adverse environmental effects. Cooling towers produce drift, which is formed by tiny water droplets 50–10$\mu$ in size entrained in the effluent air and a plume which includes the drift but is mainly condensation which forms droplets 10–20$\mu$ in size. The droplets are formed by cooling the moisture laden air resulting from the evaporative mechanism of the tower. The environmental impact of the plume has many facets which range from the aesthetically unappealing plumes to the formation of localized fog and ice which produce local hazardous driving conditions. Drift droplets, since they are larger, can cause "rain" downstream of the cooling tower and icing conditions in the winter. If the cooling tower water is of high mineral content soil contamination may result.

The reduction and elimination of drift from a cooling tower and its associated affects have been subject of considerable research. Devices known as drift eliminators have been designed with varying degrees of success.

Wet or wet-dry cooling towers utilize sprays and packing to break the water into small droplets to increase surface area so as to bring the water into intimate contact with influent cooling air, thus many of the droplets become airborne and flow with the cooling air. To remove these airborne or entrained droplets from the effluent air, drift eliminators are generally disposed downstream of the evaporative cooling portion of the towers and generally comprise a plurality of closely disposed parallel chevron or sinusoidal louvers or vanes. The spaces between the vanes form passageways which cause the effluent air to make frequent changes in direction. These drift eliminators utilized the inertial effect of the multiple turns to cause the droplets to impinge upon the louvers and coalesce covering the surface thereof, and then flow by gravity therefrom. These drift eliminators are affective as they remove a substantial amount of entrained moisture from the effluent air, however, they produce large pressure drops.

SUMMARY OF THE INVENTION

Among the several objects of this invention is the provision of a drift eliminator, which utilizes the gravitational effect on the droplets to drive them to the lower surface of drift eliminator and minimizes the suddenness of the turns, to optimize the relationship of pressure drop and collection efficiency; the provision of a drift eliminator, which does not foster reentrainment of the collected water; and the provision of a drift eliminator, which is both economical to produce and to maintain.

In general a drift eliminator for moisture laden air, when made in accordance with this invention, comprises a plurality of curved vanes having generally smooth curved surfaces disposed between their leading and trailing edges. The vanes are disposed so that adjacent vanes cooperate to define a continous smooth curved flow path, which gradually changes direction between 45° and 90°. The vanes have their leading edges and trailing edges, respectively, disposed generally tangent to the flow path of the influent and effluent moisture laden air.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
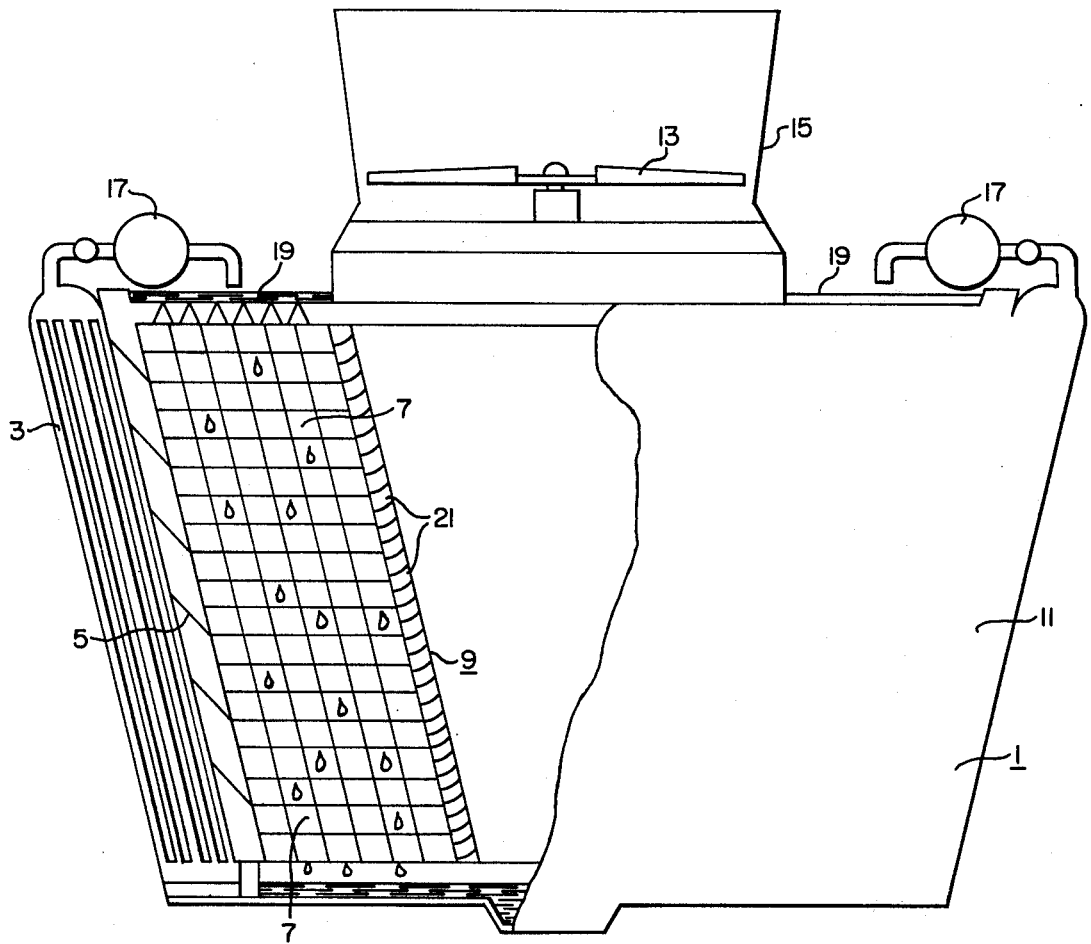
FIG. 1 is a partial sectional elevational view of a wet-dry cooling tower having a drift elimininator made in accordance with this invention.

Referring now to the drawings in detail, FIG. 1 shows a mechanical induced draft wet-dry cooling tower 1. The cooling tower 1 has a finned tube heat exchanger 3 disposed to form opposing walls, a plurality of louvers or vanes 5 disposed inboard of the heat exchanger 3 to direct the flow of influent fluid or air and prevent water from splashing onto the finned tube heat exchanger 3, packing or fill 7 disposed inboard of the louvers 5 to break up the influent water into smaller droplets to increase surface area and to bring the water into intimate contact with the influent cooling air, and a drift eliminator 9 disposed inboard of the packing 7. End walls 11 enclose the other sides of the cooling tower 1 and a fan 13 is disposed above the tower in a venturi shaped fan stack 15. The fan stack 15 is in fluid communication with the central portion of the cooling tower 1 so that as the fan 13 is operated cooling air is drawn through the heat exchanger 3, the louvers 5, to fill 7 and the drift eliminator 9. A manifold or pipe distributor 17 is disposed above the fill 7 and distributes influent, hot circulating water to a plurality of perforated trays 19 disposed above the fill 7. The water cascades down over the fill 7 and is broken into small droplets which come into intimate contact with the influent cooling air. The pipe distributor 17 also feeds warm influent water to the finned tube heat exchanger 3. The proportion of flow to the finned tube heat exchanger or the fill is determined by the ambient air conditions and the temperature of the influent circulating water.

The influent air flows over the heat exchanger 3 and then through the fill area picking up or entraining moisture or water droplets, which are formed by the water cascading through the fill. The moisture laden air then passes through the drift eliminator 9 which operates to effectively remove much of the entrained moisture from the effluent air.

Figure 2:
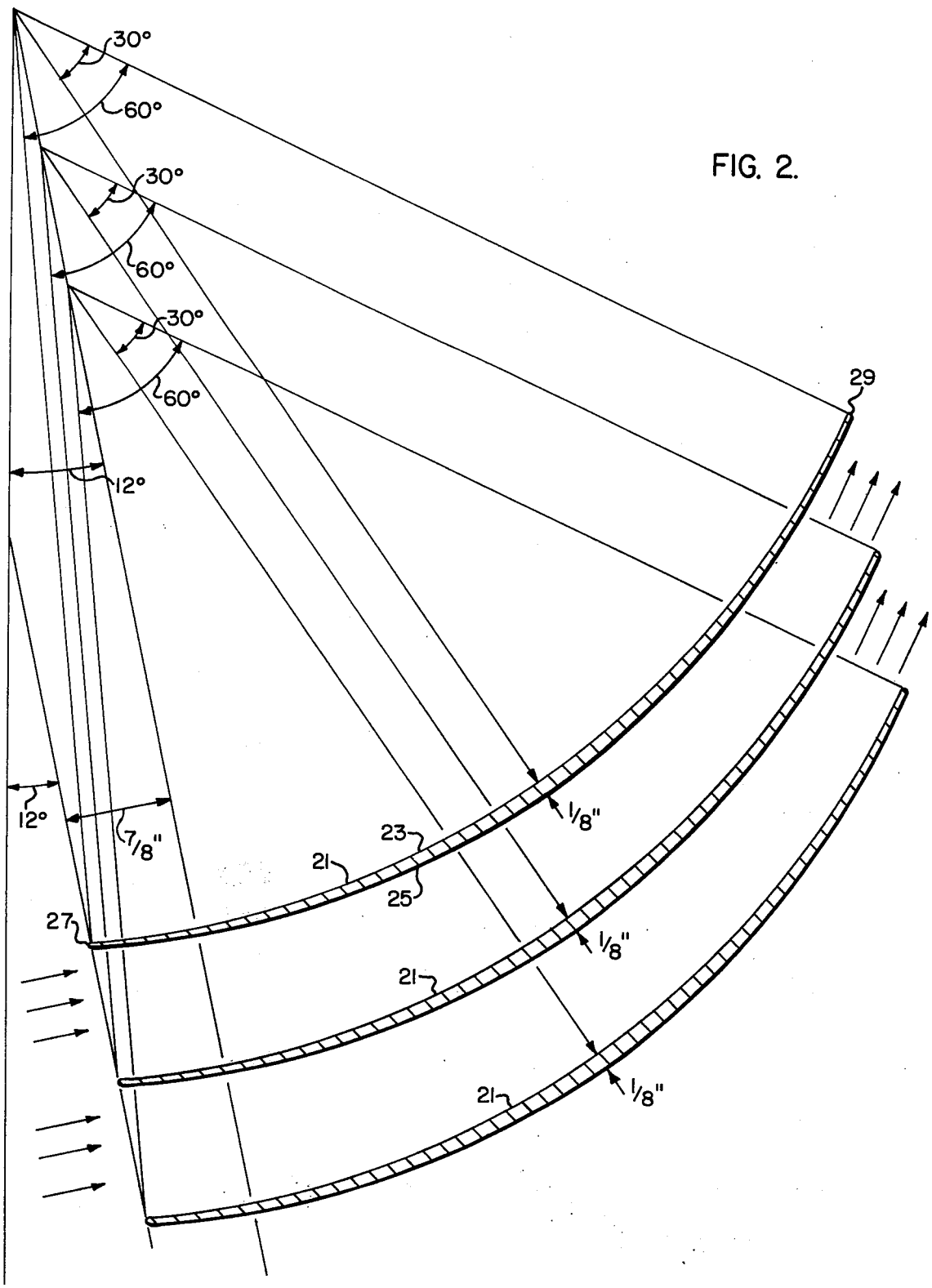
FIG. 2 is an enlarged sectional view of a portion of the drift eliminator.

As shown in FIG. 2, to effectively remove the entrained moisture and to minimize the pressure drop therethrough, the drift eliminator 9 comprises a plurality of elongated curved vanes 21 having generally smooth curved or arcuate surfaces 23 and 25. The curve surfaces 23 and 25 are generally segments of a cylndrical surface and generally have different radii, the lower surfaces 25 having a smaller radius of curvature. The included angle of the surfaces 23 and 25 are generally greater than 45° and less than 90°, 60° being the included angle of the embodiment shown in FIG. 2. The circular arc length of the curved surfaces 23 and 25 is generally between 3 and 12 inches and the surfaces are generally several feet long. The vanes 21 generally have a crescent shape cross section and generally parallel longitudinal margins or edges 27 and 29. Thus, the vanes generally increase in thickness from their edges to the center, the edges 27 and 29 are slightly rounded as sharp edges are difficult to manufacture and present maintenance problems as sharp edges are easily damaged in handling, during installation and in performing routine maintenance on the tower.

The vanes 21 are so disposed that adjacent vanes cooperate to define a continuous smooth curved flow path, which generally changes direction between 45° and 90°. The vanes 21 are so disposed that the flow path is generally upward and at least a portion of the flow path is converging. In the embodiment shown in FIG. 2, the entire flow path is converging. The leading edges 27 of the vanes 21, the edges first contacting the influent moisture laden air, are aligned in a plane which forms an acute angle of generally in the range of 20° with respect to a vertical plane, the angle depending on the flow path of the air as it flows through the fill portion 7 of the cooling tower 1. The vanes 21 are generally so disposed that their leading and trailing edges 27 and 29 and the curved surfaces contiguous therewith, respectively, are generally tangent to the path of the influent and effluent air passing through the drift eliminator 9. Thus disposed, the vanes 21 cooperate with their generally streamline shape to produce a drift eliminator, which optimizes the relationship of pressure drop and collection efficiency by emphasizing the gravitational effects on the droplets and minimizing the inertial effects of sudden directional changes and minimize the cost of production to provide an economic and efficient drift eliminator.

What is claimed is:

1. A cooling tower which brings water in direct contact with cooling air, said cooling tower having a pair of generally imperforate end walls, a louvered wall extending between said end walls at one side of said cooling tower; fill disposed inwardly of said louvered wall and generally extending between said end walls, said fill being disposed to break up influent water to increase its surface area and bring it into intimate contact with influent cooling air, whereby some of the moisture is entrained in the air to produce moisture laden air; a pan disposed above said fill to distribute water over said fill; a venturi shaped stack disposed above and connected to said cooling tower; a fan disposed in said stack so as to draw cooling air through said louvered wall and fill and exhaust said air through said stack; and a drift eliminator disposed inwardly of said fill, said drift eliminator comprising a plurality of elongated curved vanes which generally extend longitudinally between said end walls, said vanes being disposed in a single row and having longitudinal margins form leading and trailing edges which are joined by generally smooth curved surfaces having an arc length between 3 and 12 inches, said leading edges of said vanes being disposed inwardly of said fill in a plane forming an acute angle generally less than 20° with a vertical plane, siad vanes being disposed in a generally parallel relationship, each vane comprising an upper and lower surface of different radii, the radius of curvature of the lower surface being smaller than the radius of curvature of the upper surface, and the upper and lower surface having an included angle greater than 45° but less than 90° to define a continuous smooth curved flow path which changes direction between 45° and 90° and said vanes having their leading and trailing edges and the curved surfaces contiguous therewith generally tangent to the moisture laden air leaving the fill and flowing toward the stack, whereby a large portion of the moisture in the air is collected on the vanes and the pressure drop across the vane is minimal.

2. A cooling tower as set forth in claim 1, wherein the vanes are disposed in said cooling tower in such a manner to produce generally convergent flow paths.

3. A cooling tower as set forth in claim 1, wherein said vanes are so disposed in said cooling tower such that at least a portion of the vanes produce a generally convergent flow path.

4. A cooling tower as set forth in claim 1, wherein the vanes generally increase in thickness from their edges to the center portion thereof.

5. A cooling tower as set forth in claim 1, wherein the curved vanes generally have cylindrical surfaces.

* * * * *